(12) United States Patent
Shah et al.

(10) Patent No.: US 10,836,320 B2
(45) Date of Patent: Nov. 17, 2020

(54) LIGHT MODULE, LIGHT ASSEMBLY AND REAR VIEW DEVICE FOR A VEHICLE

(71) Applicant: SMR Patents S.à.r.l., Luxembourg (LU)

(72) Inventors: Nitesh Shah, Bengaluru (IN); Artem Rudi, Ludwigsburg (DE); Andreas Herrmann, Winnenden-Baach (DE); Sandeep Panchal, Delhi (IN); Romeo Wieczorek, Esslingen (DE); Daniel Fritz, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 270 days.

(21) Appl. No.: 15/256,540

(22) Filed: Sep. 3, 2016

(65) Prior Publication Data

US 2017/0066380 A1 Mar. 9, 2017

(30) Foreign Application Priority Data

Sep. 3, 2015 (EP) .................................. 15183758

(51) Int. Cl.
*B60Q 1/26* (2006.01)
*B60R 1/12* (2006.01)
(Continued)

(52) U.S. Cl.
CPC .......... *B60R 1/1207* (2013.01); *B60Q 1/2665* (2013.01); *B60R 1/06* (2013.01);
(Continued)

(58) Field of Classification Search
CPC ........ F21S 41/198; F21S 43/19; F21S 43/195; F21S 43/14–15; B60Q 1/24; B60Q 1/2607; B60Q 1/2665; B60Q 3/258
(Continued)

(56) References Cited

U.S. PATENT DOCUMENTS 5,823,654 A * 10/1998 Pastrick ............... B60Q 1/2665
362/494
6,227,689 B1 * 5/2001 Miller .................. B60Q 1/2665
362/494

(Continued)

FOREIGN PATENT DOCUMENTS

DE 29921059 U1 3/2000
DE 102005048497 A1 4/2007
(Continued)

OTHER PUBLICATIONS

Wright, A. (Apr. 14, 2007). FreePCB User Guide. Retrieved Sep. 13, 2018, from http://www.freepcb.com/freepcb_user_guide.pdf.*
(Continued)

*Primary Examiner* — Andrew J Coughlin
(74) *Attorney, Agent, or Firm* — MacMillan, Sobanski & Todd, LLC (57) ABSTRACT

A light module for a light assembly of an exterior rear view device comprises a light source unit with at least one wire for an electric connection with a printed circuit board of the rear view device, in particular of the light assembly. The light module further comprises a housing unit supporting the light source unit and being provided with connecting and/or holding means for the attachment to at least one part, in particular a housing part, of the rear view device. The light module also includes sealing means for water and dustproof of the connection between the light module and the at least one part. A light assembly includes at least one of such a light module, and an exterior rear view device includes such a light assembly.

15 Claims, 5 Drawing Sheets

(51) Int. Cl.
*F21S 43/19* (2018.01)
*F21S 43/14* (2018.01)
*F21S 45/47* (2018.01)
*B60R 1/06* (2006.01)
*F21V 23/06* (2006.01)
*F21V 31/00* (2006.01)

(52) U.S. Cl.
CPC ............... *F21S 43/14* (2018.01); *F21S 43/19* (2018.01); *F21S 45/47* (2018.01); *F21V 23/06* (2013.01); *F21V 31/005* (2013.01)

(58) Field of Classification Search
USPC .................................................. 362/459–549
See application file for complete search history.

(56) References Cited

U.S. PATENT DOCUMENTS

| | | | |
|---|---|---|---|
| 9,321,395 | B2 | 4/2016 | Ammar et al. |
| 2002/0024822 | A1* | 2/2002 | Pond .................... B60Q 1/2607 362/555 |
| 2003/0123260 | A1* | 7/2003 | Aynie .................... B60Q 1/302 362/544 |
| 2006/0033117 | A1 | 2/2006 | Takekuma |
| 2008/0316054 | A1* | 12/2008 | Lynam ................. B60Q 1/2665 340/904 |
| 2014/0321109 | A1* | 10/2014 | Hwu ....................... F21K 9/175 362/218 |
| 2015/0124470 | A1* | 5/2015 | Calderas ................. F21S 41/19 362/519 |

FOREIGN PATENT DOCUMENTS

| | | |
|---|---|---|
| DE | 102012012387 A1 | 12/2013 |
| DE | 202014101755 U1 | 8/2014 |
| EP | 1391348 A2 | 2/2004 |
| FR | 2630526 A1 | 10/1989 |
| JP | 2002079878 A | 3/2002 |
| JP | 2009123568 A | 6/2009 |
| WO | 2007005942 A3 | 1/2007 |
| WO | 2008137634 A1 | 11/2008 |

OTHER PUBLICATIONS

European Search Report, Application No. EP 15183758, dated Feb. 5, 2016.
European Examination Report, EP Appl. No. 15183758.0, dated Dec. 12, 2018.
European Office Action dated May 20, 2019.

* cited by examiner

LIGHT MODULE, LIGHT ASSEMBLY AND REAR VIEW DEVICE FOR A VEHICLE

CROSS-REFERENCE TO RELATED APPLICATIONS

This application claims priority from European Patent Application No. 15183758.0, filed Sep. 3, 2015, the disclosure of which is incorporated herein by reference.

BACKGROUND OF THE INVENTION

This invention relates in general to a rear view device for a vehicle. In particular, this invention relates to a light module for a light assembly of an exterior rear view device, a light assembly and rear view device for a vehicle.

US 2005/0168922 A1 refers to a light module in form of an optoelectronic component based on the surface mount technology, said component comprising a electrically conductive material, an opaque plastic material, and a cavity, wherein the electrically conductive material serves as a base for the assembly, the opaque plastic material provides a housing for the whole component, and the cavity is located within the plastic material where an optoelectronic chip is mounted in. The known light module provides a solderless LED holder without additional measures for the attachment to a device.

US 2010/0265730 A1 refers to an exterior mirror comprising a mirror head and a mirror base and the associated fairings comprised of mirror housing, mirror frame and mirror base fairing, which exterior mirror comprises at least one opening for inserting an optical indicator, wherein the mirror housing and/or the mirror frame and/or the mirror base fairing form at least one receiver, into which a respective LED with a contact body is inserted, wherein the LED protrudes into the opening of the mirror housing and/or the mirror frame and/or the mirror base fairing. The receiver comprises at least one component for producing a clip connection or at least one snap-in recess.

WO 2007/005942 A2 describes an indicator module, in particular blind spot indicator module for a rearview mirror assembly, wherein the module includes a housing, a lens element or optic element and a printed circuit board or PCB assembly. The housing includes mounting tabs protruding therefrom for flexing as the module is attached to a mounting portion within the rearview mirror assembly. The PCB assembly includes a board or substrate with an electrical connector or terminals and a plurality of illumination sources disposed thereon.

A vehicle puddle lamp assembly comprising a plurality of light projectors located on a vehicle and configured to illuminate different lighted image patterns on a surface adjacent to the vehicle and a controller for sequentially activating the plurality of light projectors to generate an animated lighted image on the surface is known from DE 20 2014 101 755 U1.

JP 2009 123568 A discloses a lighting device for a vehicle, provided with a bolt head portion which is formed of a transparent synthetic resin and has a space inside, a substrate unit which is housed in the space of the bolt head portion and is mounted with an LED, a washer which is fixed to the lower end part of the bolt head portion and has an opening, a spring which is fixed to the lower side of the washer, a through-hole which is formed along the axial line of the spring and of which one end is communicated with the opening and the other end is made open, and a power supply wire of which one end is connected to the substrate unit and the other end is led outside through the opening and the through-hole and supplies power to the LED.

WO 2008/137634 A1 refers to an illumination module for a door handle assembly of a vehicle door, said illumination module comprising: at least one illumination source and circuitry; a housing overmolded at least partially around said circuitry and said at least one illumination source; a pocket illumination portion and a ground illumination portion at said housing, illumination from said at least one illumination source being directed through said pocket illumination portion and said ground illumination portion; and said housing being configured to mount to a vehicle door handle assembly.

JP 2002 079878 discloses a side turn lamp for a rear view mirror having a plate for fixing base boards of light sources, which also serves as a power source supply means.

DE 299 21 059 U1 describes an exterior mirror, the back of which is provided with a locking groove for a light emitting base. The light emitting base is provided with a recess for LEDs having terminals which are electrically connected to the light emitting base.

It would be desirable to provide a light module for a light assembly of an exterior rear view device which is compact and easy to mount.

SUMMARY OF THE INVENTION

This invention relates to a light module for a light assembly of an exterior rear view device, a light assembly and rear view device for a vehicle.

A light module for a light assembly of an exterior rear view device, comprises a light source unit with at least one wire, which is suited for an electric connection with a printed circuit board of the rear view device, in particular of the light assembly. The light module further comprises housing unit supports the light source unit and is provided with connecting and/or holding means, which are suited for the attachment to at least one part, in particular a housing part, of the rear view device. The light module further comprises sealing means, which are suited for a water and dustproof connection between the light module and the at least one part.

It is preferred that the light source unit comprises an optoelectronic component electrically connected with the wire(s), a radiation surface, preferably provided by a transparent and/or translucent resin embedding the optoelectronic component, and an light source housing, either comprised by the housing unit or attached to the housing unit.

Further preferred embodiments of the invention can be characterized in that the housing unit is formed together with the light source housing and/or the sealing means, in particular by hot embossing or 2-K injection moulding.

The invention also proposes that the housing unit is formed with a through hole for each wire, and/or the housing unit is formed with a receiving structure for the light source unit, and/or the housing unit is formed with the connecting and/or holding means, in particular for a plug or snap connection.

It is also proposed that the connecting and/or holding means comprises at least 2 snaps, preferably each snap being provided with a stop element.

Further, it is proposed that the sealing means is placed around the perimeter of the housing unit or forms the perimeter of the housing unit in the region supporting the light source unit.

Embodiments of the invention can be characterized in that at least two light source units are supported by the housing unit, and/or each light source unit comprises an LED unit with one or more LEDs.

The invention also provides a light assembly of an exterior rear view device, in particular providing a side turn indicator, a blind spot detection, a logo lamp, a door handle light and/or an approach light, with at least one light module of the invention.

It is preferred that the light assembly also comprises at least one printed circuit board remote from the light module, to which the wire(s) is soldered and providing a soldering pad pattern.

Still further it is proposed that the soldering pad pattern comprises at least 1 pad, preferably 2 pads, for each light module, with each pad having an area of 3 to 5 mm$^2$ and/or the 2 pads having a distance of at least 0.5 mm or an extension of a length and/or width of at least 0.5 mm, and/or outside the pad(s) a solder resistant is provided on the printed circuit board.

With the invention it is also proposed that one electronic circuit board unit is connected to each light module and a power supply, and/or one electronic circuit board unit is connected to two or more light source units, in particular the light source units being connected in a serial or in parallel.

Preferred embodiments of the invention can be further characterized in that the electronic circuit board unit comprises at least one driver circuit for directly or indirectly connecting to the power supply and at least one printed circuit board, preferably one printed circuit board for all light modules of a plurality of light modules or one printed circuit board for each light module.

With the invention it is also proposed that at least one plug connection for electronically and physically connecting the printed circuit board(s) and/or the driver circuit is provided.

In addition, the invention also provides an exterior rear view device for a vehicle, comprising at least one light module according to the invention and/or at least one light assembly according to the invention.

It is preferred that the radiation surface of the light module flushes with the exterior surface of at least one housing part of which the light module is attached via its connecting and/or holding means.

The light module of the invention is provided with a plurality of advantages by making usage of three components in form of a light source unit, a housing unit and a sealing means. At first, it is to be noted that the light source unit, which can be an LED unit, is not comprising a printed circuit board such that a solderless light source holder is provided which reduces production costs. In addition, the housing unit not only holds or supports the light source unit but also is provided with connecting and/or holding means for facilitating the attachment of the light module in a rear view device, which also reduces production costs. Still further, due to the fact that the sealing means is provided for water and dustproof, the lifetime of the light module within the exterior rear view device is prolonged.

It can be advantageous to form the housing unit together with a light source housing of the light source unit and/or the sealing means, in particular in a 2-K injection moulding process, saving further costs.

The light module of the invention has to be connected to a remote printed circuit board as it does not comprise its own one, such that a high degree of flexibility with respect to mounting positions within the exterior rear view device is given. Thus, a light assembly of the invention making usage of a single printed circuit board connected to a plurality of electronic consumer units, comprising light modules of the invention, has a very simple system architecture with a reduced amount of parts.

The printed circuit board of the light assembly has an improved heat dissipation and enhanced performance due to a special soldering pad pattern. For example one light module of the invention can be connected with two wires to two pads of said pattern with the minimal distance between said two pads being at least 0.5 mm and/or there being an extension at each pad having at least one dimension of at least 0.5 mm. Still further, the printed circuit board can be covered by a solder resistant outside the soldering pads.

In case the light module of the invention is provided with several light source units connected in parallel, the amount of wires to be connected to the soldering pad pattern can be reduced compared to a separate arrangement of each light source unit.

An exterior rear view device of the invention can make usage of one or more light modules of the invention, in particular for providing a side turn indicator, a blind spot detection, a logo lamp, a door handle light and/or an approach light. Each of those functions can be fulfilled by a light module of the invention, with even all of said light modules can be connected to a single circuit board arranged remote from said light modules providing a high degree of flexibility with respect to the arrangement of said light modules within the exterior rear view device.

As each light module is provided with a sealing means, substantially no water and dust can enter the interior of the exterior rear view device which is necessary to guarantee a long lifetime.

Various aspects of this invention will become apparent to those skilled in the art from the following detailed description of the preferred embodiment, when read in light of the accompanying drawings.

BRIEF DESCRIPTION OF THE DRAWINGS

FIG. 5a is a perspective top view of a housing unit together with an LED unit of a light module of a third embodiment of the invention.

FIG. 5b is a perspective bottom view of the unit of FIG. 5a.

DETAILED DESCRIPTION OF THE PREFERRED EMBODIMENTS

Figure 1A:
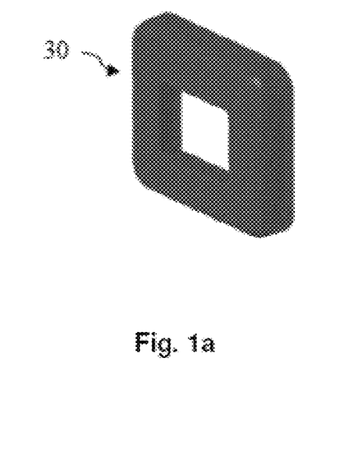
FIG. 1a is a perspective view of a sealing means of a first embodiment of a light module of the invention.
Figure 1B:
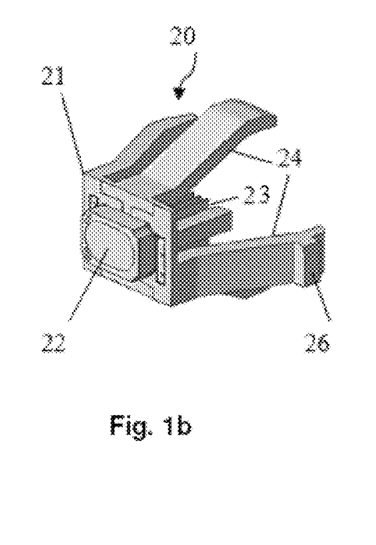
FIG. 1b is a perspective view of a combination of an LED unit and a housing unit of the light module of the first embodiment of the light module of the invention.
Figure 1C:
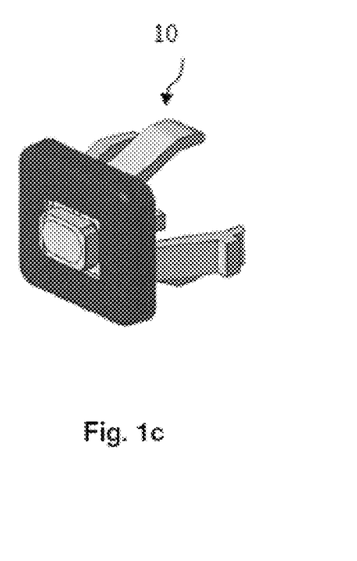
FIG. 1c is a perspective view of the light module of the first embodiment with the sealing means of FIG. 1a and the combination of the LED unit and the housing unit of FIG. 1b.

A first embodiment of a light module of the invention will be described in the following with reference to FIGS. 1a to 1c. The light module 10 comprises two parts in form of an LED unit 20, see FIG. 1b, to which a sealing means in form of a gasket 30, shown in FIG. 1a, is to be attached as shown in FIG. 1c. The LED unit 20 comprises a housing unit 21 supporting a radiation surface 22 and providing four connectors 24 in form of snaps, two of which are provided with extensions in form of holders 26. The radiation surface 22 can be provided by a transparent and translucent resin material embedding an optoelectronic chip connected to two wires extending through the housing 21 in order to be connected to a remote printed circuit board (not shown) not belonging to the light module 10. The housing unit 21 further includes a receiving structure 23 for supporting the light source unit adjacent to the radiation surface 22.

Figure 2:
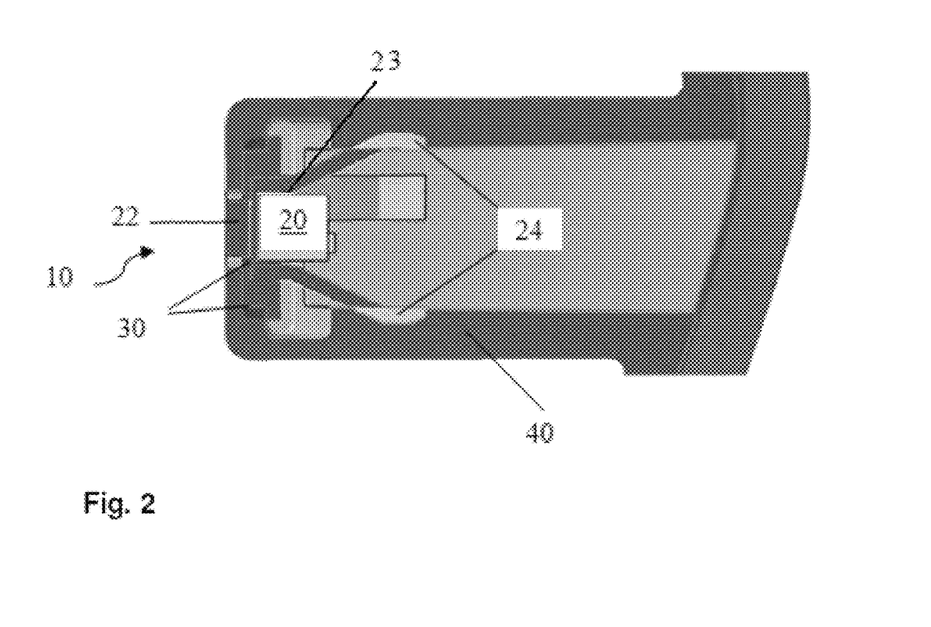
FIG. 2 is a cross section of a rear view mirror part into which the light module of FIG. 1c is installed.

FIG. 2 shows the light module 10 as installed within a rear view mirror housing part 40 such that the radiation surface 22 is arranged within an opening of said part 40. The opening is closed in a water and dusttight manner by the gasket 30; and the light module 10 is attached within the exterior rear view mirror by a snap connection provided via the connectors 24 and avoiding a displacement via the holders 26 functioning as stop members.

Figures 3A, 3B, 3C, 4:
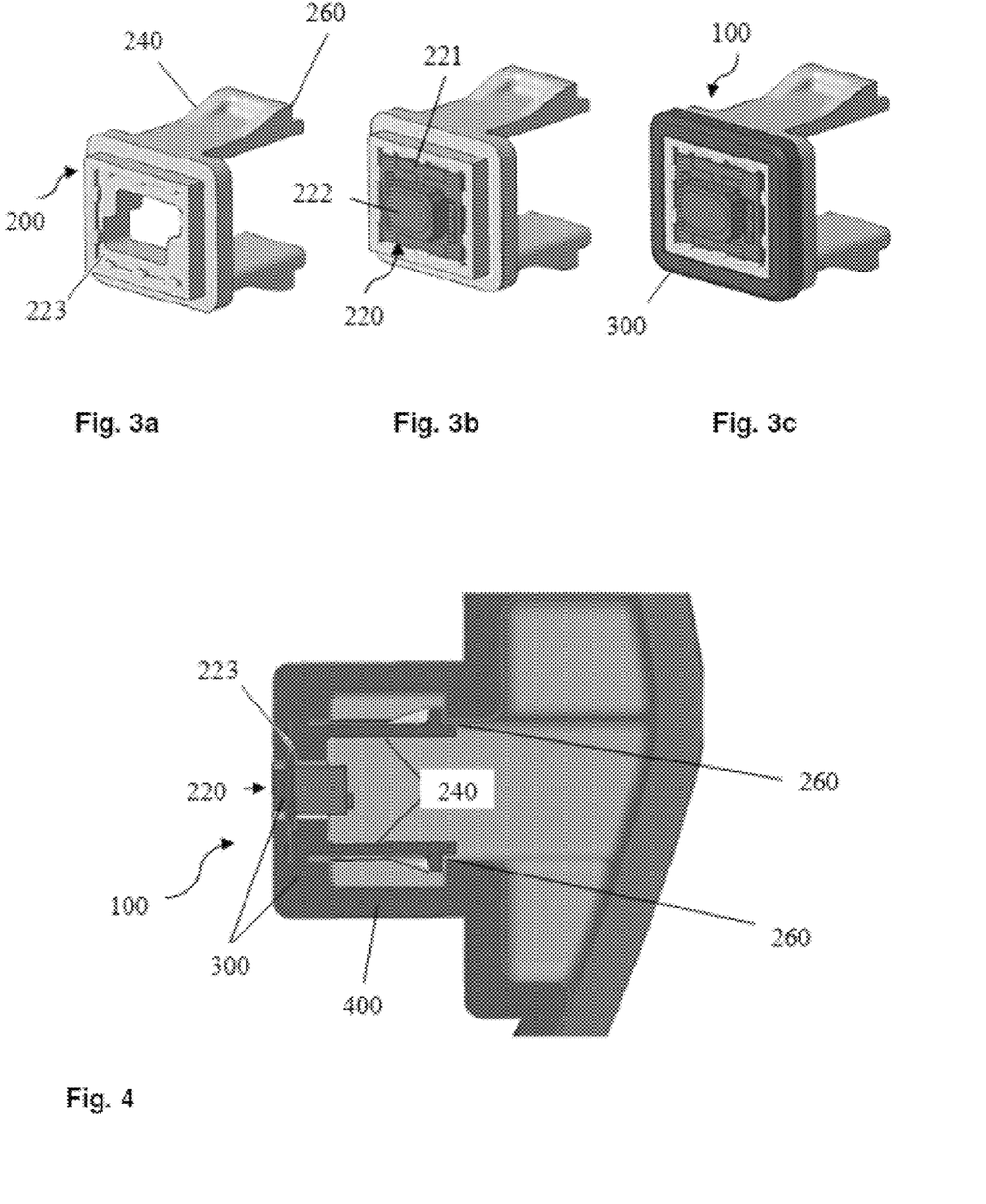
FIG. 3a is a perspective view of a housing unit of a light module of a second embodiment of the invention.
FIG. 3b is a perspective view of the housing unit of FIG. 3a together with an LED unit.
FIG. 3c is a perspective view of the housing unit and the LED unit of FIG. 3b together with a sealing means providing the light module of the second embodiment.
FIG. 4 is a cross section of the light module of FIG. 3c installed in a part of an exterior rear view mirror.

FIGS. 3a to 3c show an alternative light module of the invention. The alternative light module 100 differs from the light module 10 by the fact that the housing unit 200 shown in FIG. 3a is provided separately from the LED unit 220 shown in its position installed within a receiving structure 223, illustrated as a recess formed in the housing unit 200 in FIG. 3b. As the LED unit 220 is separately provided from the housing unit 200, it comprises its own LED housing 221 for supporting a radiation surface 222. The housing unit 200 is provided with two connectors 240 each provided with a holder 260. In addition a gasket 300 is provided to complete the light module 100 as shown in FIG. 3c.

The three parts of the light module 100, namely the housing unit 200, the LED unit 220 and the gasket 300 can be provided separately as shown in FIGS. 3a to 3c. But it can also be advantageous to not only combine the housing unit 200 with the LED unit 220, namely by having the LED housing 221 comprised by the housing unit 200 as shown with respect to the light module 10 in FIGS. 1a to 1c, but also to form the housing unit 200 together with the gasket 300 in a two component injection moulding process. As an alternative, an embossing technology can be used.

FIG. 4 shows the installation of the light module 100 within a rear view mirror housing part 400. The installation is achieved by a snap connection via the connectors 240 avoiding a misplacement by the holders 240 abutting against a step provided by the housing part 400 such that the radiation surface 220 flushes with the front surface of the part 400 as shown in FIG. 4.

Figures 5A, 5B:
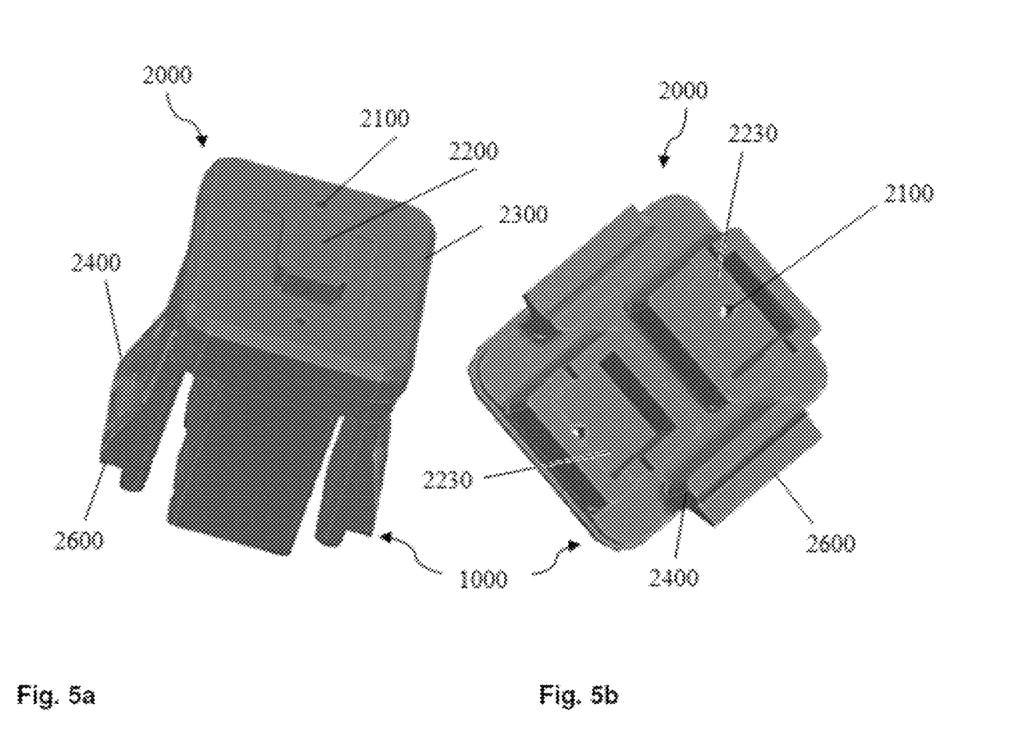

FIGS. 5a and 5b show two perspective views of a single part light module 1000 comprising a housing unit 2000, an LED unit 2200 and a gasket 2300, by forming together the LED housing, the gasket 2300 and the housing unit e.g. as a 2-K injection moulding piece. The housing unit 2000 is provided with four connectors 2400 two of which are provided with a holder 2600. FIGS. 5a and 5b show in addition two wire through holes 2100. The LED unit 2200, in particular an electrooptic chip thereof (not shown), has to be connected to a remote circuit board, which requires two wires (not shown) to be connected to the LED unit 2000.

With respect to the connection of said wires to a remote circuit board within a light assembly of the invention reference will be made in the following to FIG. 6.

Figure 6:
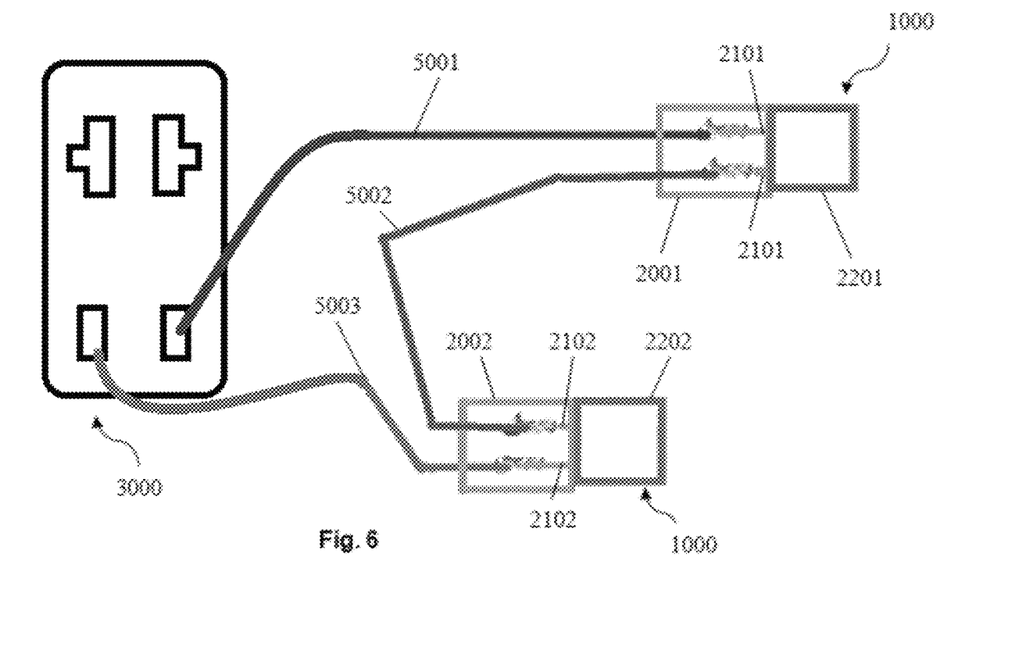
FIG. 6 is a schematic diagram of two light modules of the invention in a serial connection.

FIG. 6 shows two times the single piece light module 1000 depicted in FIGS. 5a and 5b, namely a housing unit 2001 carrying an LED unit 2201 as well as a housing unit 2002 carrying an LED unit 2202. Each of the housing units 2001 includes a receiving unit 2230 that supports the LED unit 2201. The LED unit 2201 is connected with two wires 2101 which pass the through holes 2100 shown in FIGS. 5a and 5b in order to be connected to wires 5001 and 5002, in particular by a crimp connection. The LED unit 2202 is connected with two wires 2102 which are connected to the wire 5002 as well as a wire 5003. The wires 5001 to 5003 provide a serial connection of the two LED units 2201 and 2202 as soon as being connected, in particular soldered, to a printed circuit board 3000.

Figure 7:
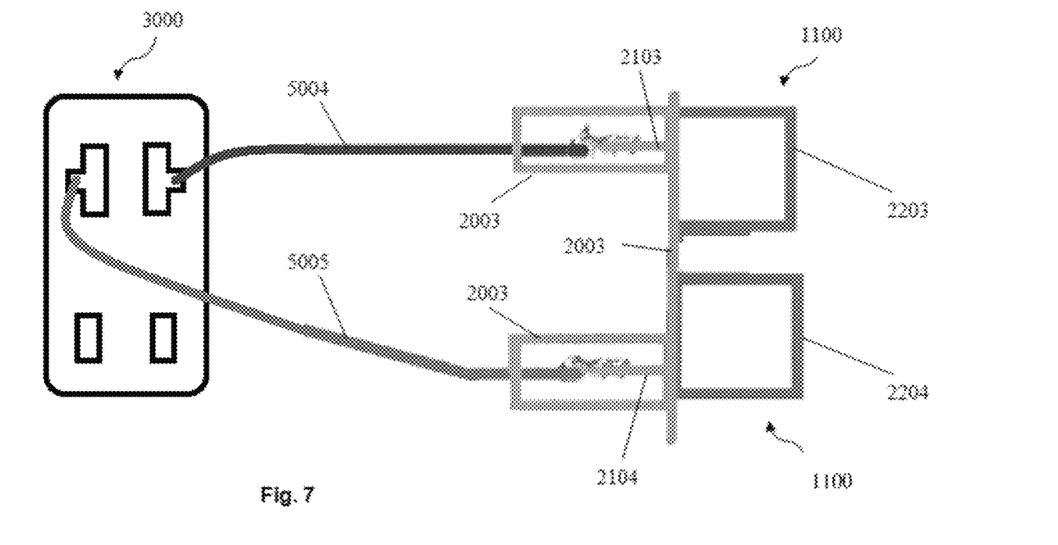
FIG. 7 is a schematic diagram of a light module of a fourth embodiment of the invention with one housing unit and two LED units.

FIG. 7 shows an alternative light module 1100 with a housing unit 2300 supporting two LED units 2203 and 2204 connected to wires 2103 and 2104, each of which being connected to a wire 5004, 5005. The two LEDs units 2203 and 2204 can be connected in parallel to a remote, not shown printed circuit board via the wires 5004 and 5005.

The connection of the wires to a printed circuit board within of the light assembly will be explained in further detail with respect to FIGS. 8 and 9 in the following. Each of said Figures shows a soldering pad pattern 6000 and 7000.

Figure 8:
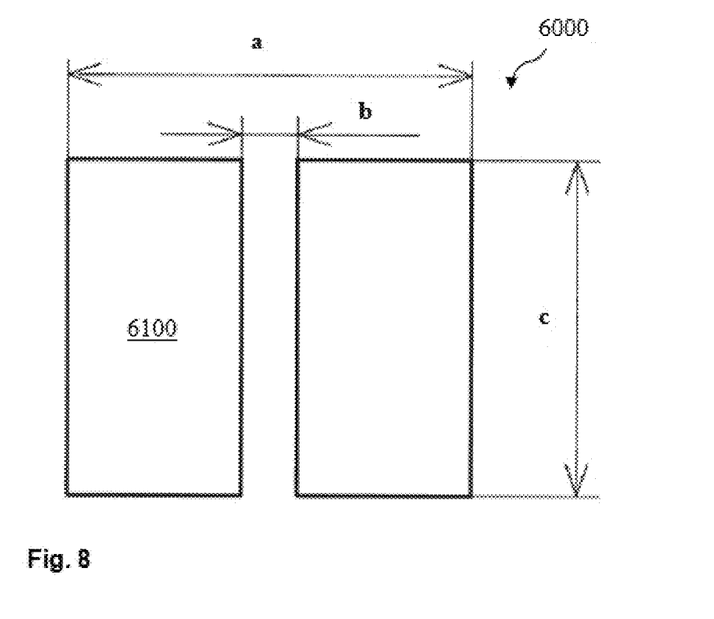
FIG. 8 is a first soldering pad pattern to be used with a light assembly of the invention.

The soldering pad pattern 6000 shown in FIG. 8 comprises two soldering pads 6001 being arranged with a distance b=0.5 mm. Each pad 6100 has a height c=3 mm, and a width of the combination of the 2 pads 6100 is d=3.6 mm. This geometry provides a favourable heat dissipation and performance.

Figure 9:
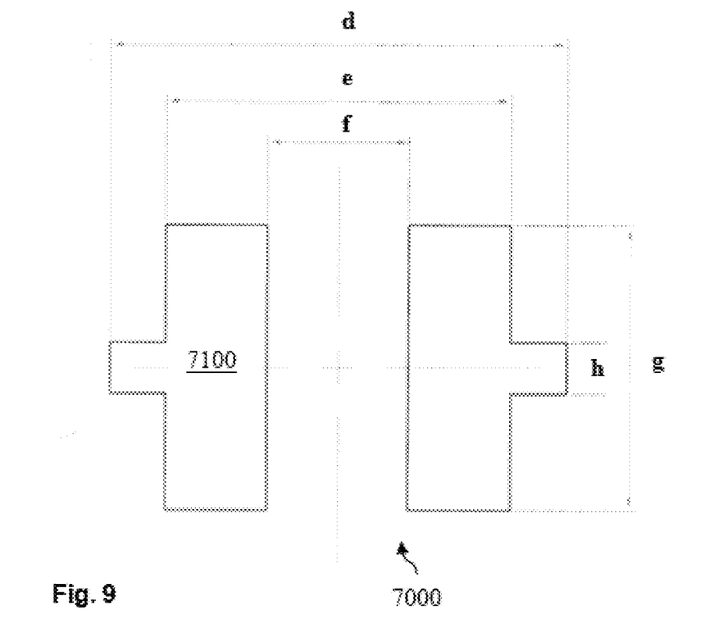
FIG. 9 is a second soldering pad pattern to be used with a light assembly of the invention.

The alternative pattern of FIG. 9 has two soldering pads 7001 being arranged with a larger distance f=1.4 mm but each having an extension being defined by a minimal height h=0.5 mm. The width d of both pads 7001 together is 4.5 mm and the width except for the extensions is e=3.4 mm. Each pad has a height g=2.8 mm. This geometry ensures an increased performance.

The printed circuit board can be covered, outside the pads 6100 or 7100, with a soldering resistant in order to even further enhance the heat dissipation.

By connecting e.g. both LED units 2201 and 2202 of FIG. 6 to a single remote circuit board, not only a high degree of flexibility with respect to the mounting positions of the respective light modules is provided, but also the amount of parts is highly reduced by avoiding one printed circuit board per light unit.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A light assembly of an exterior rear view device having a light module and at least one printed circuit board, the light module comprising:

a light source unit with at least one wire in electrical communication with the at least one printed circuit board of the light assembly of the exterior rear view device, the light source unit comprising a radiation surface and a light source housing, a housing unit supporting the light source unit and being provided with connecting and/or holding means for attachment to at least one portion of a housing part of the exterior rear view device, and a sealing means between the light module and the at least one portion of the housing part, wherein the printed circuit board is remote from the light module and has a soldering pad pattern, and the at least one wire of the light source is soldered to the printed circuit board, the sealing means forming a perimeter of the housing unit in the region supporting the light source unit, the housing unit formed together with the light source housing and the sealing means by 2-K injection moulding.

2. The light assembly of claim 1, wherein the light source unit comprises:
an optoelectronic component electrically connected with the at least one wire, and
the radiation surface is provided by a transparent and/or translucent resin embedding the optoelectronic component in the housing unit.

3. The light assembly of claim 1, wherein the housing unit is formed with a through hole for each wire, and/or the housing unit is formed with a receiving structure for the light source unit, and/or the housing unit is formed with the connecting and/or holding means for a plug or snap connection.

4. The light assembly of claim 1, wherein the connecting and/or holding means comprises at least two snaps, each snap being provided with a stop element.

5. The light assembly of claim 1, wherein at least two light source units are supported by the housing unit, and/or each light source unit comprises an LED unit with one or more LEDs.

6. The light assembly of claim 1 supported by the exterior rear view device and providing at least one of a side turn indicator, a blind spot detection, a logo lamp, a door handle light or an approach light.

7. The light assembly of claim 1, wherein the soldering pad pattern comprises two pads for each light module.

8. The light assembly of claim 7, wherein each pad has an area of 3 to 5 mm$^2$, and/or the 2 pads have a distance of at least 0.5 mm or an extension of a length and/or width of at least 0.5 mm.

9. The light assembly of claim 8, comprising:
outside the pad or pads a solder resistant is provided on the printed circuit board,
one electronic circuit board unit connected to each light module and a power supply, and/or
one electronic circuit board unit connected to two or more light source units, the light source units being connected in series or the light source units being connected in parallel.

10. The light assembly of claim 9, wherein the electronic circuit board unit comprises at least one driver circuit for directly or indirectly connecting to the power supply and at least one of one printed circuit board for all light modules of a plurality of light modules or one printed circuit board for each light module.

11. The light assembly of claim 10, wherein at least one plug connection for electronically and physically connecting the printed circuit board(s) and/or the driver circuit is provided.

12. The light assembly of claim 7, wherein outside the pads a solder resistant is provided on the printed circuit board.

13. An exterior rear view device for a vehicle, comprising at least one light module comprising:
a light source unit with at least one wire, a radiation surface, and a light source housing, the at least one wire soldered to a pad of a remotely located printed circuit board of the exterior rear view device,
a housing unit supporting the light source unit and being provided with at least one of a connecting or holding means for attachment to at least one portion of a housing part of the exterior rear view device, and a sealing means between the light module and the at least one portion of the housing part, the housing unit formed together with at least one of the light source housing or a sealing means by hot embossing or 2-K injection moulding, and
at least one light assembly providing at least one of a side turn indicator, a blind spot detection, a logo lamp, a door handle light and/or an approach light.

14. The exterior rear view device of claim 13, wherein the connecting and/or holding means of the light module is attached to the housing part of the exterior rear view device and the sealing means provides a water and dustproof connection between the light module and the exterior rear view device housing part.

15. The exterior rear view device of claim 13, wherein the radiation surface of the light module is flush with an exterior surface of the housing part of which the light module is attached via its connecting and/or holding means.

* * * * *